United States Patent
Deschamps (10) Patent No.: US 8,218,045 B2
(45) Date of Patent: Jul. 10, 2012

(54) IMAGE SENSOR CONTROL METHOD

(75) Inventor: Benoît Deschamps, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 954 days.

(21) Appl. No.: 12/109,353

(22) Filed: Apr. 25, 2008

(65) Prior Publication Data

US 2009/0027532 A1    Jan. 29, 2009

(30) Foreign Application Priority Data

Apr. 27, 2007   (FR) ..................................... 07 54767

(51) Int. Cl.
*H04N 3/14* (2006.01)

(52) U.S. Cl. .......... 348/297; 348/308; 348/299; 257/59; 250/208.1

(58) Field of Classification Search ........................ None
See application file for complete search history.

(56) References Cited

U.S. PATENT DOCUMENTS

| | | | |
|---|---|---|---|
| 6,348,681 B1 | 2/2002 | Kindt et al. | |
| 2005/0167602 A1* | 8/2005 | Dierickx | 250/370.01 |
| 2006/0249731 A1* | 11/2006 | Ladd | 257/59 |
| 2008/0218602 A1* | 9/2008 | Kozlowski | 348/231.99 |

FOREIGN PATENT DOCUMENTS

WO    WO 02/056584 A1    7/2002

OTHER PUBLICATIONS

French Search Report from corresponding French Application No. 07/54767, filed Apr. 27, 2007, Search report dated Sep. 4, 2007.

* cited by examiner

*Primary Examiner* — Nicholas G. Giles
*Assistant Examiner* — Yih-Sien Kao
(74) *Attorney, Agent, or Firm* — Wolf, Greenfield & Sacks, P.C.

(57) ABSTRACT

A method for acquiring images using at least one CMOS-type sensor with four transistors including an acquisition node and a read node, where the read node can receive a compression signal, including a step of reading a reference state of the sensor; a reset step; an integration step, during which the sensor is exposed and during part of which the compression signal is applied to the read node; and a step of reading the data acquired during the integration step; the read node being, during the integration step, isolated from the acquisition node, except immediately before the application of the compression signal, at which time the acquisition node is connected to the read node long enough to enable a transfer of the charges present at the acquisition node to the read node.

21 Claims, 4 Drawing Sheets

IMAGE SENSOR CONTROL METHOD

BACKGROUND OF THE INVENTION

1. Field of the Invention

The present application generally relates to image sensors made in monolithic form and used in digital image acquisition devices such as cameras and photographic devices. The present application relates to such devices, whether they are autonomous or incorporated in a device having other functions such as, for example, a portable phone or an automobile, air or water vehicle during a night travel or in adverse weather conditions.

The present application more specifically relates to a so-called high dynamic range image sensor implementing a compression method.

2. Discussion of the Related Art

A pixel of an image sensor essentially comprises a reverse-biased photodiode having its junction capacitance discharged by a photocurrent as a function of a received light intensity. The lighting level received by a pixel is determined by measuring the voltage across the photodiode at selected times among which the end of a so-called image acquisition or integration period, before and after which the pixel is reset by recharging its photodiode. The decrease in the voltage across the photodiode during the acquisition, that is, the intensity of the photocurrent having discharged its capacitance, is proportional to the light intensity. For high light intensities, the photocurrent may be such that the discharge of the junction capacitance during the acquisition phase adversely affects the measurement. In particular, beyond a given light intensity threshold, which depends on the integration time and on the features of the pixel elements, the photodiode reaches before the end of the integration time a so-called saturation discharge level and luminosity differences are no longer discriminated. To increase the discrimination of light areas of strong intensity, the pixel has been provided to be controlled during part of the integration time period, generally the second half thereof, to enable compression of the signal. A sensor using such a compression enables obtaining images having a decreased contrast, which enables covering an increased lighting range and is called a high dynamic range sensor.

However, whatever the imager synchronization mode, imagers using pixels with four transistors, in which a transfer transistor is interposed between the cathode of the photodiode and a read node, have unexpected malfunctions. In particular, saturations of the sensors can be observed while the compression should enable pushing back the saturation limit.

The above expression "image synchronization mode" applies to rolling shutter devices and to global shutter devices. In a rolling shutter device, each pixel line is successively exposed, the integration times of each line being offset with respect to one another. In a global shutter device, all sensor pixels are exposed simultaneously. A global shutter device preferably uses pixels with four transistors.

A rolling shutter device could indifferently use pixels with four transistors or pixels with three transistors which comprise no transfer transistor. However, due to the previously-described malfunctions, rolling shutter imagers preferably use pixels with three transistors.

However, imagers with three transistors exhibit various unwanted effects which do not exist with imagers with four transistors. Especially the photodiodes used in a pixel with three transistors exhibit a high reverse current (or dark current) which, further, significantly increases as the temperature increases. This dark current is linked to the structure of the photodiodes and especially to the presence of many interfaces with insulators in the charge storage area. Pixels with four transistors however use photodiodes in which the reverse current is considerably decreased, especially since the charges are stored in an area having its volume limited by non-insulating regions.

SUMMARY OF THE INVENTION

An object is to overcome all or part of the disadvantages of known image sensors with a high dynamic range.

Another object of the present invention is to increase the performances of image sensors using pixels with four transistors.

Another object is to improve the data compression of such sensors.

To achieve all or part of these and other objects, an embodiment of the present invention provides a method for acquiring images by means of at least one CMOS-type sensor with four transistors comprising an acquisition node and a read node, where the read node can receive a compression signal, comprising a step of reading a reference state of the sensor, also comprising the following steps:

a reset step;

an integration step, during which the sensor is exposed and during part of which the compression signal is applied to the read node; and a step of reading the data acquired during the integration step;

the read node being, during the integration step, isolated from the acquisition node, except immediately before the application of the compression signal, at which time the acquisition node is connected to the read node long enough to enable a transfer of the charges present at the acquisition node to the read node.

According to an embodiment, the compression signal is a pulse train, the acquisition node being connected to the read node before application of each compression pulse to the read node.

According to an embodiment, the compression signal is applied during the last half of the integration step.

According to an embodiment, the compression signal is applied during the last quarter of the integration step during which the sensor is exposed.

According to an embodiment, the compression signal is applied during the last eighth of the integration step.

According to an embodiment, the step of reading a reference state of the sensor is implemented immediately after the reset step.

According to an embodiment, the step of reading a reference state of the sensor is implemented during the integration step immediately before the first charge transfer.

According to an embodiment, the present application also provides an image acquisition device of rolling shutter type implementing the method of any of the foregoing embodiments.

The foregoing and other objects, features, and advantages of the present invention will be discussed in detail in the following non-limiting description of specific embodiments in connection with the accompanying drawings.

DETAILED DESCRIPTION

For clarity, the same elements have been designated with the same reference numerals in the different drawings and, further, the timing diagrams of FIGS. 2, 3, 4, 5, and 6 are not drawn to scale.

Figure 1:
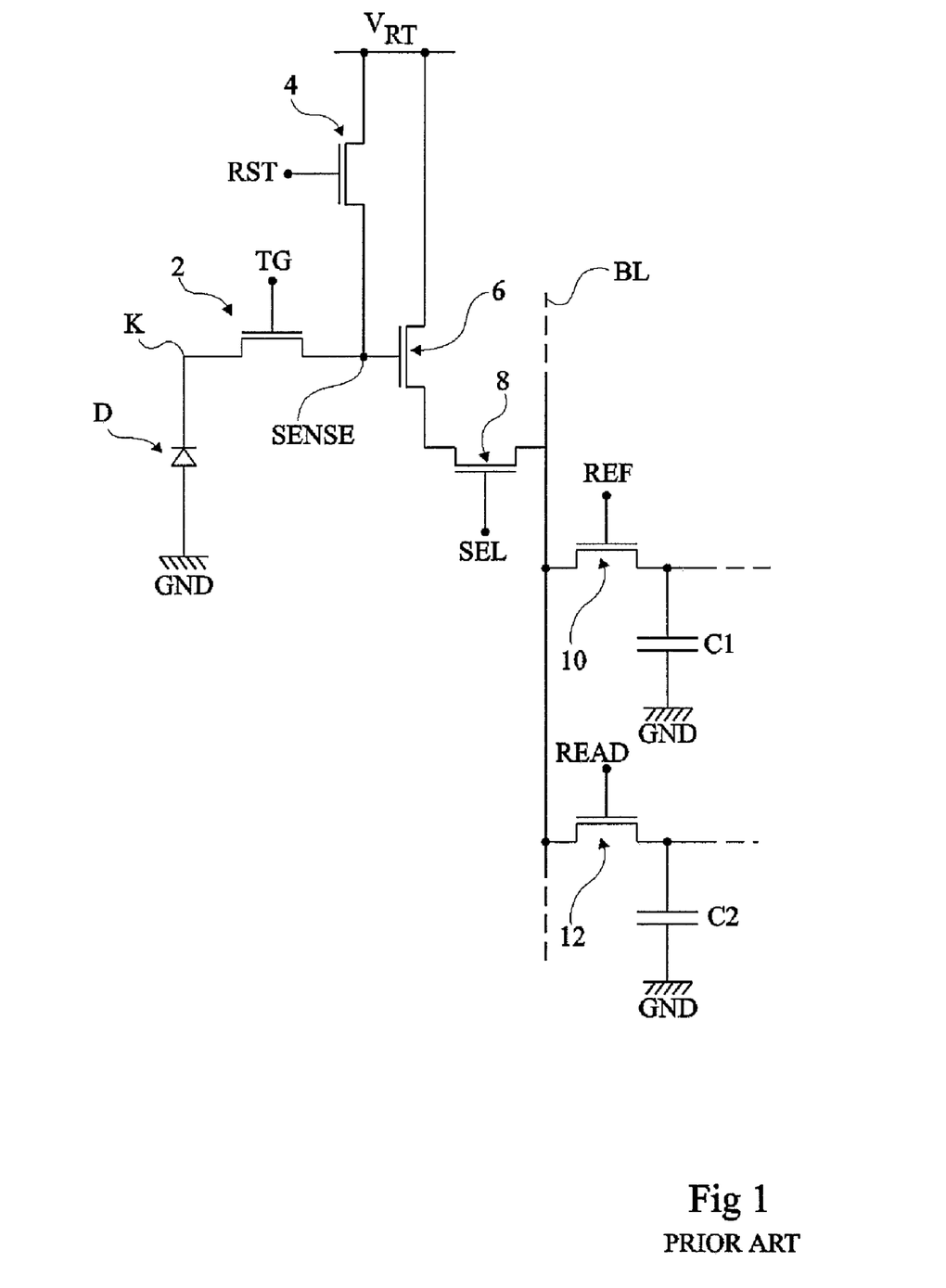
FIG. 1 illustrates in the form of a circuit diagram an example of an image sensor pixel with four transistors.

FIG. 1 illustrates an equivalent electric diagram of a pixel of an image sensor with four transistors. The pixel comprises a photodiode D used in reverse. The anode of photodiode D is connected to a low supply rail, generally ground GND of the circuit. Its cathode K is connected, via a transfer transistor 2, to a read node SENSE. Node SENSE is connected, by a reset/compress transistor 4, to a high supply rail $V_{RT}$. Node SENSE is further connected to the gate of a transistor 6 assembled as a follower source. The drain of transistor 6 is connected to high supply rail $V_{RT}$. The source of transistor 6 is connected by a selection transistor 8 to a bit line BL of the array network comprising the pixel.

For example, two identical capacitive sampling elements C1 and C2 are connected between bit line BL and ground GND. A respective switch 10, 12 connects bit line BL and each of elements C1 and C2. Elements C1 and C2 enable performing a differential reading.

For example, the different transistors 2, 4, 6, and 8 as well as switches 10 and 12 all are N-channel transistors.

Figure 2A:
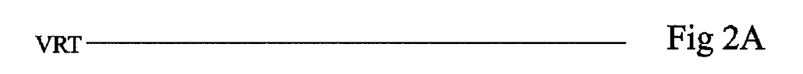
FIGS. 2A, 2B, 2C, 2D, 2E, and 2F are timing diagrams which illustrate an operating mode of the pixel of FIG. 1.
Figure 2B:
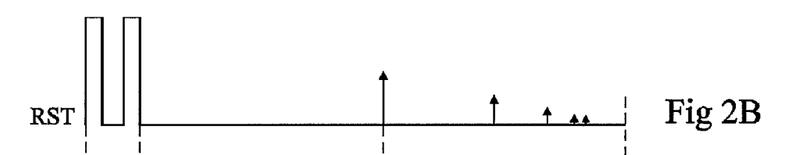
Figure 2C:
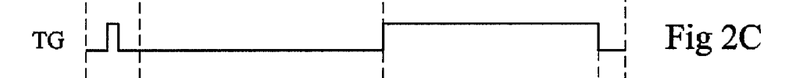
Figure 2D:
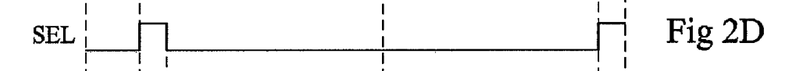
Figure 2E:
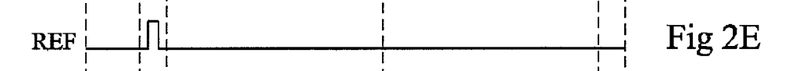
Figure 2F:
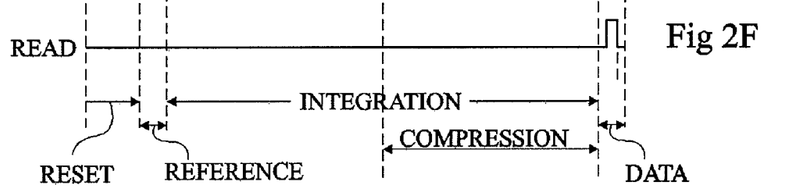

FIGS. 2A, 2B, 2C, 2D, 2E, and 2F are timing diagrams illustrating the operation of the sensor of FIG. 1. FIG. 2A shows the shape of high supply voltage $V_{RT}$. FIG. 2B illustrates control signal RST of reset/compress transistor 4. FIG. 2C illustrates control signal TG of transfer transistor 2. FIG. 2D illustrates control signal SEL of selection transistor 8. FIG. 2E illustrates control signal REF of reference transistor 10 associated with element C1. FIG. 2F illustrates control signal READ of read transistor 12 associated with capacitive element C2.

In a read mode, as will appear from the following description, capacitive element C1 is intended to form a reference element, taking into account the state of node SENSE after a resetting of the pixel. Capacitive element C2 is then intended to be a read element, taking into account the state of node SENSE at the end of a data acquisition or integration (exposure to light).

An image acquisition starts with a reset phase RESET. This phase is performed in three steps. First, signal RST is at a level, for example, high, such that reset transistor 4 is completely on to reset node SENSE to level $V_{RT}$ (to within the gate-source voltage drop of transistor 4). Then, signal RST is at a low level such that reset transistor 4 is completely off to isolate node SENSE from power supply $V_{RT}$. Transfer transistor 2 is then controlled (FIG. 2C) to be turned on to reset node K by transferring all charges to node SENSE. Then, transfer transistor 2 is turned back off, isolating node SENSE from node K, and the state of node SENSE is reset again.

As soon as the reset is over, a phase REFERENCE where the reference is read is started. Signal SEL controls selection transistor 8 so that it is on. Signal REF is then switched so that transistor 10 is on for the reference state of the pixel to be stored in capacitive element C1. Signals SEL and REF are synchronized to only maintain transistors 8 and 10 off for the minimum time period necessary to sample the reference data. Then, transistors 8 and 10 are maintained off during the entire integration period. Similarly, at the end of a data acquisition phase INTEGRATION, before the next reset period, a phase DATA where the data are read takes place. Signals SEL and READ are switched to enable transfer of the pixel state into element C2. The data of C1 and C2 are then compared. Such a double sampling enables avoiding possible dispersions of the threshold voltage of follower transistor 6 from one pixel to the other. In practice, the reference level stored by capacitance C1 is obtained after a reset subsequent to the read sampling stored in C2 at the end of the integration period.

During light exposure phase INTEGRATION, the voltage at node K (not shown) tends to decrease under the effect of the light intensity received by the photodiode. As known, beyond a given threshold, the photodiode is totally charged with electrons before the end of the integration time. The read data are then the same for all light intensities greater than this threshold. It is then no longer possible to discriminate high light intensities which may be very different.

To increase the dynamic range of the sensor, a compression is carried out during the integration, phase COMPRESSION. As described in international application N° 2004/064386 for a sensor with three transistors, during this phase, transistor 4 tries to impose on node SENSE a lower and lower voltage $U_{comp}$ at closer and closer time intervals. For this purpose, it is possible to turn on transistor 4 and to switch power supply $V_{RT}$ to lower and lower levels. According to a variation, it is preferable to maintain voltage $V_{RT}$ stable and cause partial more and more reduced successive openings of transistor 4. For this purpose, as described in International application N° 2004/064386, signal RST (FIG. 2B) applied on the gate of transistor 4 is formed of a sequence of closer and closer pulses of decreasing values. Preferably, pulses RST follow a logarithmic decay law.

For the considered sensor with four transistors, as provided in article "A wide-VGA CMOS Image Sensor with Global Shutter and Extended Dynamic Range" by N. Bock et al., published in IEEE Workshop 2005, pages 222 to 225, from the beginning of phase COMPRESSION, signal TG is switched to a level, for example, high, such that transfer transistor 2 is on, enabling transfer of charges from node K to node SENSE. During the entire integration time period, and thus also during the compression phase, photodiode D is exposed to a light intensity. Photodiode D discharges with a given slope proportional to the light intensity to which it is exposed. Such a discharge imposes on node SENSE a discharge level $U_d$ which especially depends on the value of the light intensity, on the initial level, and on the exposure time.

The behavior of node SENSE at the time of the application of a compression level $U_{comp}$—that is, of a pulse RST on the gate of transistor 4—depends on the difference between level $U_d$ imposed by the discharge and compression level $U_{comp}$ which is attempted to be imposed by transistor 4.

FIGS. 3A, 3B, 3C, and 3D illustrate in detailed fashion a study carried out by the inventor of the behavior of node SENSE during a compression phase according to the method of FIG. 2.

Figure 3A:
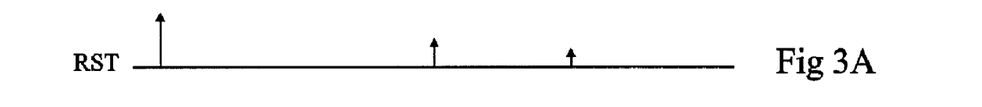
FIGS. 3A, 3B, 3C, and 3D are timing diagrams which illustrate part of the operation of the pixel of FIG. 1.

For clarity, as illustrated by the shape of signal RST shown in FIG. 3A, a simple case in which only three successive compression pulses are applied by transistor 4 is considered. In other words, it is attempted to apply to node SENSE three successively decreasing compression voltage values Ucomp1, Ucomp2, and Ucomp3.

Figures 3B, 3C:
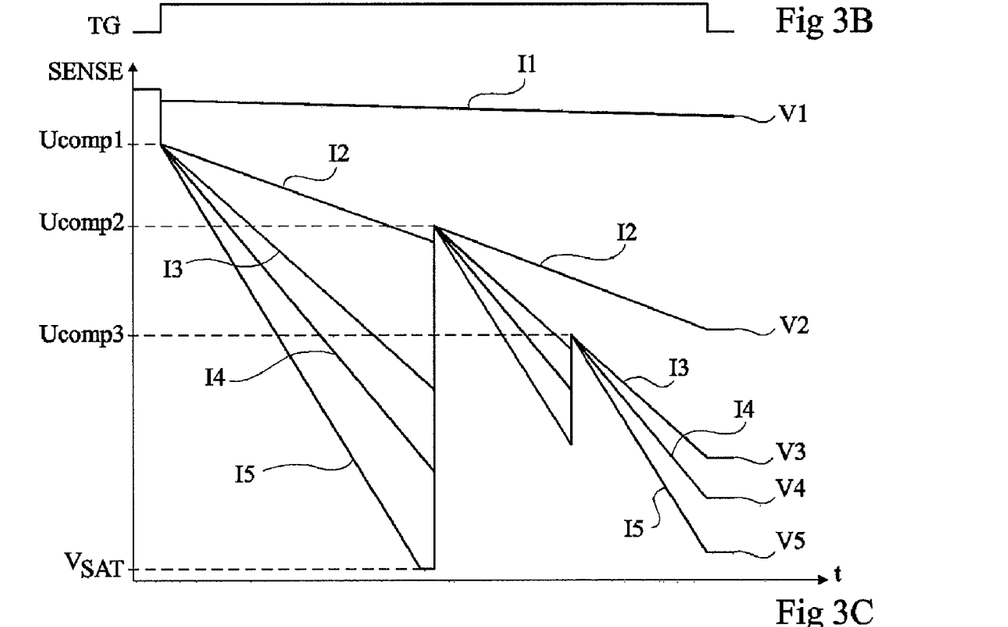

As described, signal TG, illustrated in FIG. 3B, is maintained during the entire compression at a state, for example, high, such that transfer transistor 2 is fully on.

Figure 3D:
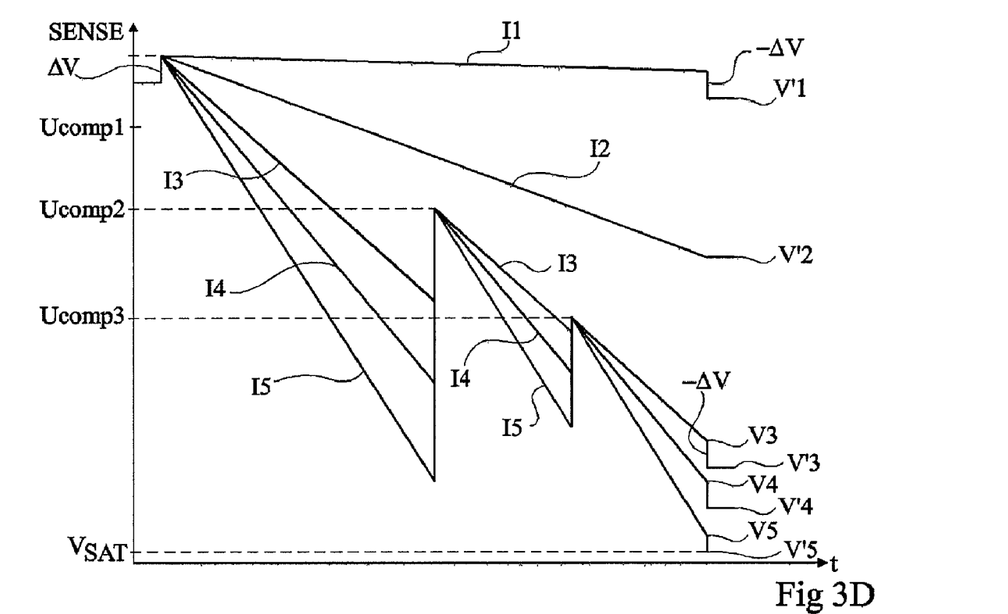

FIG. 3C illustrates the theoretical shape of the variation of the voltage level at node SENSE when the photodiode is exposed to five distinct increasing light intensities I1, I2, I3, I4, and I5 (I1<I2<I3<I4<I5). FIG. 3D illustrates the real variation of the voltage at node SENSE for the same five light intensities.

As illustrated in FIG. 3C and as indicated previously, the shape of signal SENSE depends on the comparison of value Ud imposed by the discharge of the photodiode and of value Ucomp1, Ucomp2, or Ucomp3 which is attempted to be imposed by transistor 4.

When compression level $U_{comp}$ is lower than level $U_d$ imposed by the discharge, as is the case for intensity I1 from as soon as the first compression at level Ucomp1, the discharge is not affected. The pixel reaches at the end of the integration a level V1 which only depends on the integration time, on intensity I1 and on the precharge level.

When compression level $U_{comp}$ is greater than the level $U_d$ imposed by a light intensity I2, I3, I4, or I5, compression level Ucomp1, Ucomp2, or Ucomp3 is imposed on node SENSE and the discharge starts again from level $U_{comp}$.

This mechanism is repeated for each application of a compression level Ucomp1, Ucomp2, and Ucomp3. Thus, as illustrated in FIG. 3C, it should be understood that if the level reached by the discharge caused from a previous compression level Ucomp1 by a light intensity such that intensity I2 is greater than the considered compression level Ucomp2, the discharge carries on without being affected by the compression.

However, if, at the time of the application of the next compression level Ucomp2 or Ucomp3, the level reached by the discharge caused by a light intensity I3, I4, or I5 is smaller than the considered compression level, the discharge resumes from this compression level.

Thus, intensities I2, I3, I4, or I5 which are confounded in the absence of a compression due to a saturation of the pixel are discriminated by distinct levels of node SENSE V2, V3, V4, and V5.

Anomalies with respect to the previously-described theoretical operation can however be observed in practice.

As illustrated in the right-hand portion of FIG. 3D, the observed values V'1, V'2, V'3, V'4, and V'5 are different from the expected values. A modification in the observed values as well as in their distribution with respect to one another can be observed. The observed contrasts are increased, the color or dynamic range of the sensor being reduced.

The inventor explains such results by an effect ΔV of modification—generally a rise—of the voltage level at node SENSE which occurs on turning on of transfer transistor 2. Such a modification then disappears on turning off of transistor 2. This modification can be explained by capacitive coupling phenomena which occur between control TG of transfer transistor 2 and node SENSE. This modification affects the observed values as well as their distribution, and thus the contrast scale. The modification may be such that the compression becomes inoperative.

For clarity, it is assumed that the capacitive coupling is such that the introduced modification ΔV results in imposing a particularly disadvantageous situation, such that, as illustrated in FIG. 3D, all the observed values at the end of the integration are affected.

For the highest light intensities (I3, I4, or I5), the induced discharge is strong enough for the successive compressions Ucomp2 and Ucomp3 to be performed despite the modification. The level reached at the end of the integration before the switching to the off state of transistor 2 is the expected level V3, V4, or V5. The turning-off of transistor 2 cancels the coupling effect, that is, introduces the inverse effect −ΔV which correspondingly modifies—lowers in the considered example—the observed values. On the one hand, the observed values are affected. On the other hand, for very high light intensities (I5), the introduction of the inverse effect brings the observed values back to a saturation value $V_{SAT}$. Normally-discriminated light intensities are no longer so. The dynamic range is decreased.

For light intensities of average value (I2), the modification is such that they are no longer affected by the compression. Thus, as appears from the comparison of FIGS. 3C and 3D, the discharge according to intensity I2 is no longer affected by the compression at Ucomp2. The distribution of such intensities with respect to the other intensities is then modified.

It should be understood by those skilled in the art that in the case of an exposure of an imager to low light intensities, not likely to be affected by the compression, the previously-described effect is negligible. In the case of images exhibiting an extended luminosity range for high light intensities, this effect is however irremediable since the observed values as well as their value distribution are modified, some intensities (I2) being no longer affected by the compression and others (I5) being no longer discriminated with respect to the saturation level.

FIGS. 4A, 4B, 4C, 4D, 4E, and 4F are timing diagrams illustrating control signals $V_{RT}$, RST, TG, SEL, REF, and READ according to another example.

As compared with the timing diagrams of the same signals of FIGS. 2A, 2B, 2C, 2D, 2E, and 2F, only the shape of control signal TG of transfer transistor 2 is modified. More specifically, as appears from the comparison of FIGS. 2C and 3C, signal TG is formed of a series of pulses. More specifically, the pulses all have a same optimal value such that transfer transistor 2 is controlled to completely turn on to enable full transfer of the charges from node K to node SENSE. Pulse sequence TG is synchronized with compression signal RST so that transfer transistor 2 is thus only on immediately before the application of a compression signal RST. Transfer transistor 2 is off for the rest of the integration. In particular, it should be noted that pulses TG are such that transfer transistor 2 is turned back off before application of a compression pulse RST. During the application of a compression pulse RST, transfer transistor 2 is then non-conductive and isolates node SENSE from node K. Transistor 4 is then not affected by the (discharge) photocurrent from diode D. The level $U_{comp}$ possibly needed by the compression that may be needed.

For example, transistor 2 is maintained on before application of a pulse RST only for the minimum time required to ensure the transfer of the state of node K to node SENSE.

Such a control of the transfer transistor with pulses especially enables increasing the sensor dynamic range.

A control with a series of pulses of the transfer transistor (FIG. 4C) before each compression pulse (FIG. 4B) enables eliminating the previously-described effect. Indeed, for each charge transfer, the capacitive coupling effect is introduced and immediately removed. The state of node SENSE then only depends on the amount of photoelectric charges without being affected by a coupling effect. To the different light intensities I1, I2, I3, I4, and I5 then correspond the expected distinct read values V1, V2, V3, V4, and V5 (FIG. 3C).

It should be noted that the fact for a control by successive pulses of transfer transistor 2 to also be advantageous with respect to a situation in which the transistor is permanently maintained on is unexpected since those skilled in the art would expect the introduction of such a pulse within the pixel to disturb the system.

Such a pulse control enables using pixels with four transistors in rolling shutter systems rather than pixels with three transistors. This is advantageous since it enables, in the case of images with a low signal level (that is, with low light intensities), improving the contrast of such systems by eliminating—or by considerably decreasing—the noise introduced by the dark current present in pixels with three transistors. The decrease of this noise in practice enables decreasing the contrast of the obtained images by extending the range of discriminated light intensities, that is, the sensor dynamic range.

Figure 5A:
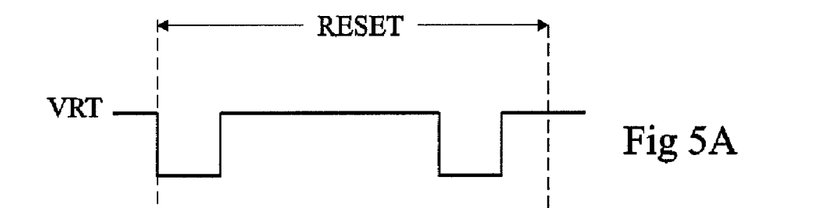
FIGS. 5A, 5B, and 5C are timing diagrams which illustrate an operating mode of a reset phase of the image sensor of FIG. 1.
Figure 5B:
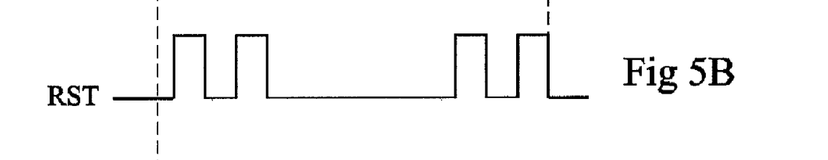
Figure 5C:
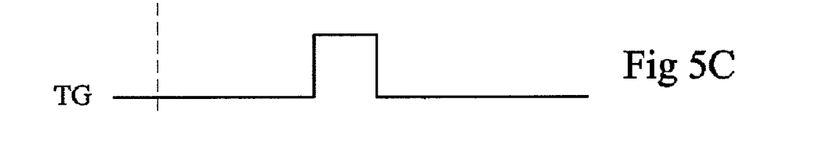

FIGS. 5A, 5B, and 5C are timing diagrams which illustrate signals VRT, RST, and TG, respectively, during an embodiment of a reset phase.

According to an embodiment, reset phase RESET is modified as follows.

During the reset, it has been discussed that node SENSE is in practice reset twice, once at the beginning and once at the end of phase RESET. Between the two resets of node SENSE, node K is reset by a charge transfer at node SENSE as illustrated in FIG. 5C.

As illustrated in FIG. 5A, to be sure to rapidly reach, on each reset, a same relatively high level, the value of high power supply $V_{RT}$ is switched to first be at a first high value RT1, for example, on the order of 1.5 V, which is rapidly copied at node SENSE, then increased to its nominal value RTn, on the order of 3.3 V. This enables ensuring that, whatever the initial state of node SENSE, its level at the end of the reset is at least equal to first level RT1.

Preferably, as illustrated in FIG. 5B, during each of the switchings of power supply VRT, node SENSE is isolated from power supply VRT by the turning off of transistor 4.

In the previous embodiments, the reading has been performed by means of only two capacitors C1 and C2 by a doubly correlated double sampling differential reading which uses for the reading of data (stored in C2) the reference sampled immediately after the reset implemented after the reading of these data. Such a protocol enables using but two capacitors per column.

However, such a reading is altered by two non-correlated different kTC-type thermal noises introduced by the on-state resistance (ON) of transistor 4. A first noise is introduced during the initialization performed at the beginning of an integration and can be found in the data stored in C2. A second noise, different from the first one, can be found in the reference stored in C1. Although the noise origin is the same—the thermal noise of transistor 4—the values of the noises at the time of the reference reading and acquisition are different. Such noises reduce the voltage dynamic range (wanted signal to noise ratio) of the pixel.

To overcome this problem, it has been provided to use the reference data read at the beginning of the integration during the differential reading rather than the reference read before the next integration. This however requires being able to store the reference state during the integration. For this purpose, a reference memory of same size as the imager and associated with peripheral addressing circuits must be available. Thus, the kTC thermal noise introduced by transistor 4 during the initialization, present in the data read at the end of the integration, is present in the reference stored at the beginning of the integration and is eliminated in the differential reading.

For reasons of bulk of the reference device, it is often preferred to do without a complex reference device and it is accepted to keep the thermal noise by using the protocol with two capacitors only.

FIGS. 6A, 6B, 6C, 6D, and 6E are timing diagrams which illustrate an embodiment of the reference acquisition.

Figure 4A:
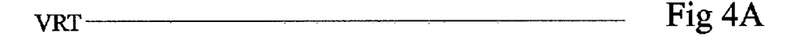
FIGS. 4A, 4B, 4C, 4D, 4E, and 4F are timing diagrams which illustrate another operating mode of the image sensor of FIG. 1.
Figure 4B:
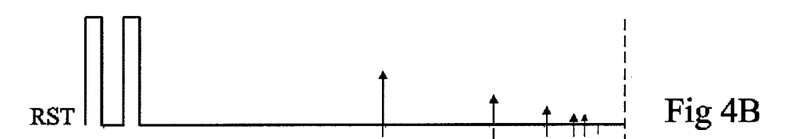
Figure 4C:
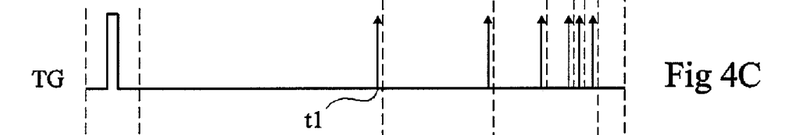
Figure 4D:
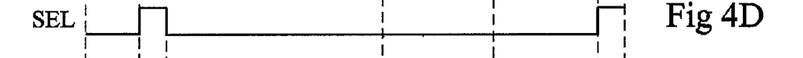
Figure 4E:
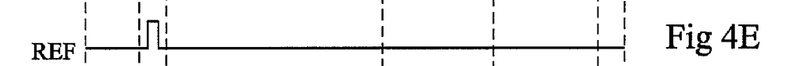
Figure 4F:
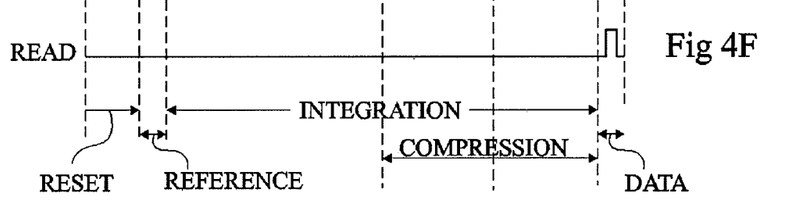

During the integration, the first charge transfer from node K (FIG. 1) to node SENSE is performed at a time t1 (FIG. 4C) by application of first transfer pulse TG (FIG. 4C). Then, first compression pulse RST (FIG. 4B) is applied.

Figure 6A:
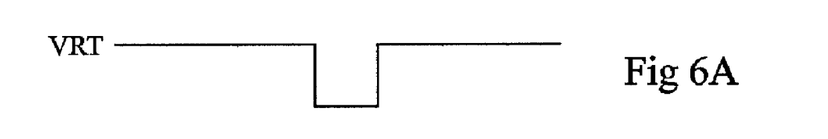
FIGS. 6A, 6B, 6C, 6D, and 6E are timing diagrams which illustrate an operating mode of a read phase of the image sensor of FIG. 1.
Figure 6B:
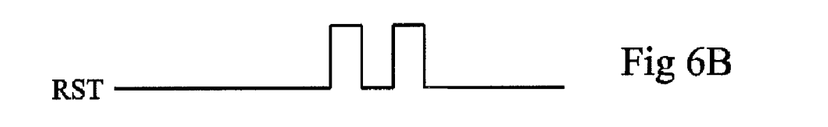
Figure 6C:
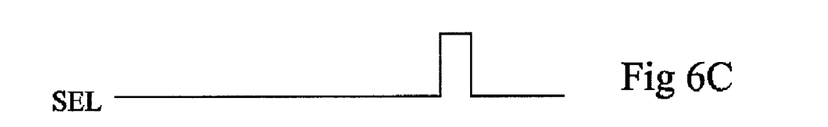
Figure 6D:
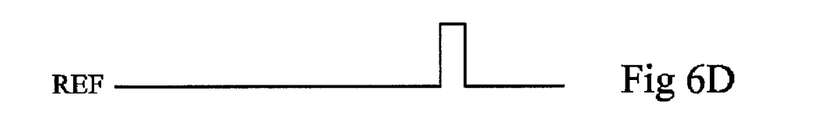
Figure 6E:
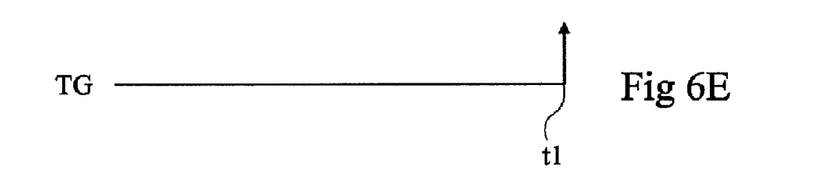

According to an embodiment, immediately before time t1, node SENSE is reset and the reference state is read. For this purpose, while transfer transistor 2 is maintained on, signal VRT is switched to a low value, then brought back to its high nominal value (FIG. 6A). Reset transistor 4 is controlled to be turned on when power supply VRT is at its low value, then turned off some time after the power supply has been brought back to its nominal value. As described in relation with FIG. 5B and as illustrated in FIG. 6B, transistor 4 may be turned off during the phase of value switching of signal VRT. Once the reset has been completed, then transfer transistor 2 is still maintained off, isolating acquisition node K from read node SENSE, signal SEL and signal REF are switched to read the reference state of node SENSE before the first charge transfer which occurs at t1.

The reference data thus acquired are stored and then compared with the data read at the end of the integration. The reference data and the read data then comprise the same thermal noise kTC which is eliminated. The quality of the obtained image is thus improved.

The price to pay for such an improvement is relatively limited. Indeed, the reference data no longer needs to be stored for the entire integration time period but only for its last part. The corresponding reference memory is then smaller than that of the sensor. For example, for a sensor with N lines, the reference data of only C lines will have to be stored, where C is a fraction of N, that is, the number of lines which simultaneously undergo the compression.

According to another example, not shown, the number of compression pulses applied by transistor 4—and correspondingly the number of switchings of transfer transistor 2—is reduced. Up to now, the compression would be performed from half of the integration period, starting with a pulse $RST_{max}$ capable of imposing on node SENSE a value to close to a reset value. Now, the first compression level(s) is (are) not applied. The compression is limited to a last fraction of the integration time, for example, to the last quarter, to the last eighth, or even to the last sixteenth of the integration time. Preferably, the number and the time of application of the applied pulses are parameterizable. During such a last fraction are applied the transfer and compression pulses provided by the full compression cycle. The time of application of the first, of the first two, or the first three or more pulses is not shifted, but these pulses are eliminated.

The inventor has observed that such a decrease in the number of pulses does not affect the response of the pixels and thus the quality of the image acquired by the sensor.

Such a decrease in the number of compression pulses is also advantageous when combined with the use of the reference read mode described in relation with FIGS. 6A to 6D. Indeed, the decrease in the number of compression pulses enables delaying the time at which the reference must be acquired. The number of lines for which the reference states must be stored is then decreased. The reference memory size is then further decreased and its use becomes effective in terms of cost and of bulk as compared with the quality gain of the sensor.

Of course, the previously-described embodiments are likely to have various alterations, modifications, and improvements which will readily occur to those skilled in the art. In particular, only those elements and operating phases necessary to the understanding of the examples have been shown and described. Thus, the way in which the control signals of an image sensor are generated has not been detailed.

Further, the method has been described as enabling elimination of a coupling effect causing a rise in the voltage level on node SENSE. It should however be understood by those skilled in the art that the described method also enable eliminating a coupling effect causing a possible lowering of the voltage.

Further, it should be understood by those skilled in the art that what has been described for pixels with four transistors also applies to pixels with five transistors, in which an additional transistor is introduced between power supply VRT and cathode K.

Further, the described method applies to any type of time synchronization used to read the data. Thus, this method can be implemented in a rolling shutter system. It can however also be implemented in a global shutter system.

Only those elements necessary to the understanding have been described. The operation and the structure of a pixel with four (or five) transistors have been simplified for clarity. It will also be within the abilities of those skilled in the art to adapt the previously-described embodiments to known circuits or introduce currently-used protection measures. Thus, in the foregoing examples, rail VRT would ensure the drain supplies of transistors 4 and 6 (as well as that of a possible fifth transistor). However, rail VRT intended to be switched on reset phases may be only connected to reset transistor 4. Another high supply rail then supplies follower transistor 6.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for acquiring images by means of at least one CMOS-type sensor with four transistors comprising an acquisition node and a sense node, where the sense node can receive a compression signal, the method comprising:
   a step of reading a reference state of the sensor;
   a reset step;
   an integration step, during which the sensor is exposed and during part of which the compression signal is applied to the sense node; and
   a step of reading the data acquired during the integration step;
   wherein, during the integration step, the sense node is isolated from the acquisition node, except immediately before the application of the compression signal, at which time the acquisition node is connected to the sense node long enough to enable a transfer of signal charges present at the acquisition node to the sense node.

2. The method of claim 1, wherein the compression signal is a pulse train, the acquisition node being connected to the sense node before application of each compression pulse to the sense node.

3. The method of claim 1, wherein the compression signal is applied during the last half of the integration step.

4. The method of claim 1, wherein the compression signal is applied during the last quarter of the integration step during which the sensor is exposed.

5. The method of claim 1, wherein the compression signal is applied during the last eighth of the integration step.

6. The method of claim 1, wherein the step of reading a reference state of the sensor is implemented immediately after the reset step.

7. The method of claim 1, wherein the step of reading a reference state of the sensor is implemented during the integration step immediately before the first charge transfer.

8. An image acquisition device of rolling shutter type implementing the method of claim 1.

9. An image acquisition device of global shutter type implementing the method of claim 1.

10. An image acquisition device including a CMOS-type sensor comprising a photosensor, a plurality of transistors, and an acquisition node and a sense node,
   wherein the CMOS-type sensor is configured to operate in an integration phase during which the photosensor is exposed and during part of which a compression signal is applied to the sense node, and is further configured to isolate the sense node from the acquisition node during the integration phase except immediately before the application of the compression signal, wherein the acquisition node is configured to be connected to the sense node long enough to enable transfer of signal charges present at the acquisition node to the sense node and then disconnected from the sense node.

11. The image acquisition device of claim 10, wherein the compression signal is a pulse train and the CMOS-type sensor is configured to temporarily connect the acquisition node to the sense node before application of each compression pulse to the sense node.

12. The image acquisition device of claim 11, further configured to apply the compression signal within a last half of the integration phase.

13. The image acquisition device of claim 11, further configured to reset the sense node and read a reference state of the sense node.

14. The image acquisition device of claim 13, wherein the reading a reference state of the sense node is configured to occur immediately before a first transfer of charges present at the acquisition node to the sense node during the integration phase.

15. The image acquisition device of claim 11, further configured to operate in rolling shutter mode.

16. The image acquisition device of claim 11, further configured to operate in global shutter mode.

17. A method of acquiring a signal from at least one CMOS-type sensor comprising a photosensor, a plurality of transistors, and an acquisition node and a sense node, the method comprising acts of:
   operating the CMOS-type sensor in an integration phase during which the photosensor is exposed to illumination;
   applying a compression signal to the sense node during part of the integration phase;
   isolating the sense node from the acquisition node during the integration phase except immediately before the application of the compression signal, wherein the acquisition node is connected to the sense node long enough to enable transfer of signal charges present at the acquisition node to the sense node and is then disconnected from the sense node.

18. The method of claim 17, further comprising:
   resetting the sense node; and reading a reference state of the sense node before applying the compression signal to the sense node.

19. The method of claim 17, wherein the compression signal is a pulse train and the isolating of the sense node occurs during the integration phase except immediately before each compression pulse wherein the acquisition node is temporarily connected to the sense node long enough to enable transfer of charges present at the acquisition node to the sense node before each compression pulse.

20. The method of claim 19, wherein the compression signal is applied within a last half of the integration phase.

21. The method of claim 19, further comprising reading a reference state of the sense node immediately before a first charge transfer from the acquisition node to the sense node.

* * * * *